Oct. 27, 1925.
T. SCHWEITZER
DISHWASHER
Filed Oct. 27, 1924
1,558,509
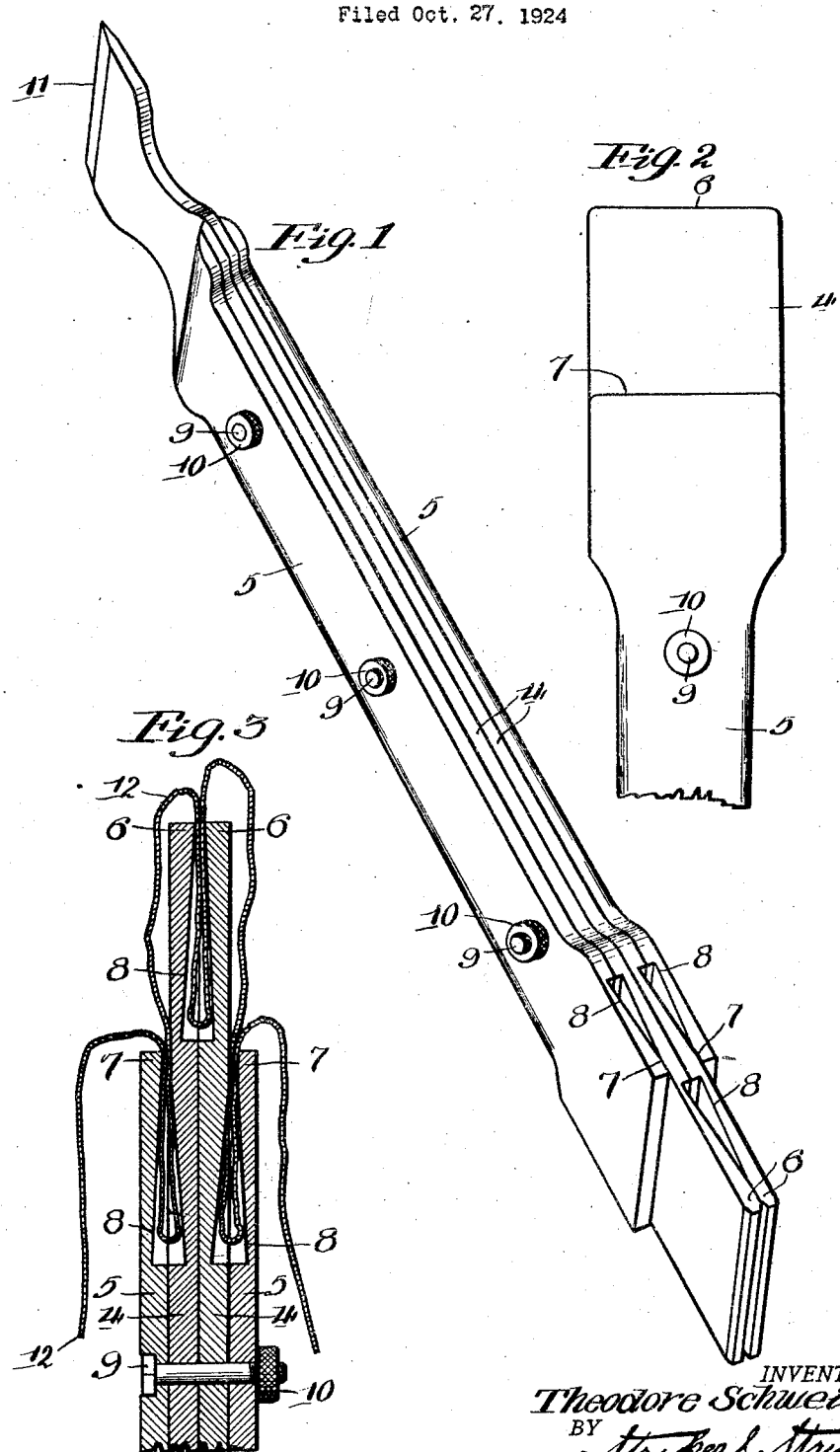

Patented Oct. 27, 1925.

1,558,509

UNITED STATES PATENT OFFICE.

THEODORE SCHWEITZER, OF ST. PAUL, MINNESOTA.

DISHWASHER.

Application filed October 27, 1924. Serial No. 746,041.

*To all whom it may concern:*

Be it known that I, THEODORE SCHWEITZER, a citizen of the United States, residing at St. Paul, in the county of Ramsey and State of Minnesota, have invented new and useful Improvements in a Dishwasher, of which the following is a specification.

It is my object to facilitate washing dishes and silver ware without scratching or otherwise defacing them and without soiling or scalding the hands, by providing a device adapted to adjustably hold a wash cloth so that the end of the holder is entirely covered by a pad formed from any convenient cloth.

A further object is to provide a device of this kind which may be readily taken apart and cleaned, means being provided for quickly and easily removing, replacing and readjusting the wash cloth.

This invention also includes certain other novel features of construction which will be more fully pointed out in the following specification and claims.

The accompanying drawings illustrate the best form of my device at present known to me. In the drawings Figure 1 is a detail perspective view of the invention with the wash cloth removed; Fig. 2 is a side elevation of an end of the device showing the cloth gripping jaws; and Fig. 3 is a longitudinal section through the jaws with a cloth therein.

Referring to the drawings, my device is composed of pairs of flat bars 4 and 5 substantially equal in width and joined to form a handle. At the outer end the bars 4 project and form a pair of jaws 6. The bars 5 being somewhat shorter than the bars 4, constitute jaws 7 upon the outer surfaces of the bars 4. Recesses 8, which are triangular in cross section, extend across the several bars adjacent to the jaws 6 and 7 to receive folds of the wash cloth, as hereinafter described. The several bars 4 and 5 are perforated to receive a series of bolts 9 having knurled nuts 10 adapted to be manipulated to permit opening the jaws 6 and 7, and to allow the bars to be separated for cleaning. A scraper 11 is formed on the end of one of the bars 4 opposite the jaws 6.

My device is adapted to receive a wash cloth or mop 12, which is preferably circular or square, although it may be any desired shape and obviously may be folded to form a pad of any desired thickness about the jaws 6 and 7. To fasten the cloth 12 in the jaws, the nuts 12 are first loosened and the jaws opened.

With the jaws held uppermost on the bars 4 and 5, said jaws are covered with the cloth 12. The central portion of the cloth is now pressed between the jaws 6 into the recess 8. Any convenient thin instrument, such as the blade of a knife, may be used to insert the cloth. The overhanging, side portions of the cloth 12 are then pressed into the recesses 8 beneath the jaws 7. Finally, the nuts 10 are tightened to close the jaws 6 and 7 firmly upon the cloth, as shown in Fig. 3.

As will now be readily understood, the cloth 12 entirely covers the projecting jaws 6 to form a pad which prevents injury to the dishes, and facilitates thorough washing. The scraper 11 may be conveniently used to remove solid matter which adheres to the dishes or pans to be cleansed. Obviously, after merely removing the bolts 9, the bars 4 and 5 may be separated and the bars and several jaws thoroughly cleansed. When the cloth 12 becomes soiled, it can be quickly replaced in the jaws 6 and 7. I prefer to form the bars 4 and 5 from a light metal, such as aluminum, but wood or other material may be utilized if desired.

Having described my invention what I claim as new and desire to protect by Letters Patent is:

1. In a device of the class described, a handle, a pair of jaws projecting from an end of said handle for holding the central portion of a wash cloth, and jaws arranged on opposite sides of said handle to hold the side portions of said cloth, whereby the same may be secured as to constitute a pad entirely covering the projecting pair of jaws.

2. In a device of the class described, a series of flat bars laid broadside one upon another, a central pair of said bars being arranged to project beyond the others at one end, clamping means on the projecting ends of said bars to receive the central portion of a cloth and securing means disposed at the sides of said central bars to receive the side portions of said cloth and thereby form a pad about the projecting ends of the central bars.

3. In a device of the class described, a series of flat bars laid broadside one upon another, a central pair of said bars being arranged to project beyond the others at an end, jaws formed on the projecting ends of said bars to receive the central portion of a cloth and jaws disposed at the sides of said central bars to receive the side portions of said cloth and thereby form a pad about the projecting ends of the central bars.

4. In a device of the class described, a series of separable, flat bars laid broadside one upon another to form a handle, a central pair of said bars being arranged to project beyond the others at one end, jaws formed on the projecting ends of said bars to receive the central portion of a cloth, jaws disposed at the sides of said central bars to receive the side portions of said cloth, and means for clamping the several jaws upon the cloth and for uniting the several bars.

In testimony whereof, I have hereunto signed my name to this specification.

THEODORE SCHWEITZER.